(12) United States Patent
Chen

(10) Patent No.: US 11,120,768 B2
(45) Date of Patent: Sep. 14, 2021

(54) FRAME DROP PROCESSING METHOD AND SYSTEM FOR PLAYED PPT

(71) Applicant: GUANGZHOU SHIRUI ELECTRONICS CO. LTD., Guangzhou (CN)

(72) Inventor: Shitong Chen, Guangzhou (CN)

(73) Assignee: GUANGZHOU SHIRUI ELECTRONICS CO. LTD., Guangdong (CN)

( * ) Notice: Subject to any disclaimer, the term of this patent is extended or adjusted under 35 U.S.C. 154(b) by 18 days.

(21) Appl. No.: 16/095,054

(22) PCT Filed: Dec. 29, 2016

(86) PCT No.: PCT/CN2016/113214
§ 371 (c)(1),
(2) Date: Oct. 19, 2018

(87) PCT Pub. No.: WO2017/190514
PCT Pub. Date: Nov. 9, 2017

(65) Prior Publication Data
US 2019/0103071 A1     Apr. 4, 2019

(30) Foreign Application Priority Data

May 4, 2016     (CN) .......................... 201610294480.6

(51) Int. Cl.
*G06F 3/14*     (2006.01)
*G09G 5/08*     (2006.01)
*G06T 1/00*     (2006.01)

(52) U.S. Cl.
CPC ................. *G09G 5/08* (2013.01); *G06F 3/14* (2013.01); *G06F 3/1415* (2013.01);
(Continued)

(58) Field of Classification Search
CPC ....... G06F 3/14; G06F 3/1415; G06T 1/0007; G09G 5/08; G09G 2360/127; G09G 2360/00
See application file for complete search history.

(56) References Cited

U.S. PATENT DOCUMENTS

| | | | |
|---|---|---|---|
| 2004/0017939 A1 | 1/2004 | Mehrotra | |
| 2004/0222995 A1 | 11/2004 | Colle | |

(Continued)

FOREIGN PATENT DOCUMENTS

| | | |
|---|---|---|
| CN | 101297366 A | 10/2008 |
| CN | 104503674 A | 4/2015 |

(Continued)

OTHER PUBLICATIONS

European Application No. EP16901035.2, Extended European Search Report dated May 13, 2019, 10 pages.

(Continued)

*Primary Examiner* — Kyle R Stork
(74) *Attorney, Agent, or Firm* — Zhong Law, LLC

(57) ABSTRACT

A method and system for handling frame dropping during playback of a PPT file. The method comprises operating the DXGI screen capturing module to acquire a prepositioned frame in a graphics card cache (S100); acquiring screen data according to the prepositioned frame (S200); monitoring the screen data and timing a duration in which the screen data does not change (S300); and modifying the screen data when the duration exceeds a preset threshold (S400); performing screen capture by the DXGI screen capturing module when the screen data changes (S500). During the whole process, when the duration in which the screen data does not change exceeds the preset threshold, the screen data is actively modified, so that the frame dropping that occurs when there is no change in the screen data may be avoided, thereby (Continued)

enabling effective handling of the frame dropping during playback of the PPT file.

14 Claims, 4 Drawing Sheets

(52) U.S. Cl.
CPC ....... *G06T 1/0007* (2013.01); *G09G 2360/00* (2013.01); *G09G 2360/127* (2013.01)

(56) References Cited

U.S. PATENT DOCUMENTS

| | | | |
|---|---|---|---|
| 2005/0071786 A1* | 3/2005 | Mariani | G06F 3/038 715/856 |
| 2007/0005795 A1* | 1/2007 | Gonzalez | H04N 19/186 709/232 |
| 2009/0016704 A1 | 1/2009 | Takeuchi et al. | |
| 2011/0221898 A1 | 9/2011 | Leis | |
| 2014/0359452 A1 | 12/2014 | Roach et al. | |
| 2017/0192511 A1* | 7/2017 | Lawrenson | H04N 5/232 |

FOREIGN PATENT DOCUMENTS

| | | |
|---|---|---|
| CN | 104571851 A | 4/2015 |
| CN | 105955688 A | 9/2016 |

OTHER PUBLICATIONS

ACM Press, Direct3D 10 Programming Guide Excerpts, ACM Siggraph 2007 Courses on, Aug. 5, 2007, pp. 369-446, XP058244738, New York, New York, USA.

Li Yitian, Research on Direct X 10 Graphics Application Interception Technology, Microcomputer Applications, 2015, vol. 31, No. 7, 19 pages.

Microsoft, "DXGI Desktop Duplication Sample", 2013, 4 pages.

Chinese Application No. 201610294480.6, Chinese Office Action, 2016, 10 pages.

Zhang Longguang, "The Applied Research of Screen-sharing Technology on Projection System", 2014, 148 pages.

International Application No. PCT/CN2016/113214, International Search Report and Written Opinion dated Apr. 1, 2017, 13 pages.

\* cited by examiner

FRAME DROP PROCESSING METHOD AND SYSTEM FOR PLAYED PPT

CROSS-REFERENCE TO RELATED APPLICATIONS

This application claims priority to International Patent Application No. PCT/CN2016/113214 filed Dec. 29, 2016, which claims priority to Chinese application No. CN 201610294480.6, filed May 4, 2016, the contents of which are hereby incorporated by reference as though fully set forth herein.

TECHNICAL FIELD

The present invention relates to the technical field of image processing, in particular, to a method and system for handling frame dropping during playing PPT.

BACKGROUND

PPT (Microsoft Office PowerPoint) is a presentation software of Microsoft Corporation. A user can display a presentation on a projector or a computer, as well as print the presentation on a printer or make a film for use in a wider range of fields. PPT not only can be used to create a presentation, but also can display the presentation to the audience on a face-to-face meeting or a teleconference via the Internet or to the audience connected through the Internet.

In the Microsoft operating system, when a user performs a screen capture operation on the display interface of a display device, the user usually uses a build-in rendering system (e.g., DXGI screen capturing module, which has the characteristics of high screen capture efficiency, etc.) of the Microsoft system to capture the screens.

However, as users' requirement to the quality of PPT screen captures becomes higher, users have found that although the DXGI screen capture mode in the Microsoft system can perform screen capture efficiently, the playback of the PPT in the DXGI screen capture mode suffers the frame dropping problem.

SUMMARY

In view of the above, it is necessary to provide an effective method and system to solve the frame dropping problem associated with the playback of a PPT file in the DXGI screen capture mode.

A method for handling frame dropping during a playback of a PPT file includes following steps:
operating a DXGI screen capturing module to acquire a prepositioned frame in a graphics card cache;
acquiring screen data according to the prepositioned frame;
monitoring the screen data and timing a duration in which the screen data does not change;
modifying the screen data when the duration in which the screen data does not change exceeds a preset threshold;
responsive to determining a change of the screen data, performing screen capture using the DXGI screen capturing module.

A system for handling frame dropping during a playback of a PPT file, comprises:
a prepositioned frame acquiring module to operate a DXGI screen capturing module to acquire a prepositioned frame in a graphics card cache;
a screen data acquiring module to acquire screen data according to the prepositioned frame;
a monitoring and timing module to monitor the screen data and time a duration in which the screen data does no change;
a modifying module to modify the screen data when the duration in which the screen data does no change exceeds a preset threshold;
a screen capturing module to operate the DXGI screen capturing module to perform screen capture responsive to determining a change of the screen data.

In the method and system for handling frame dropping during playing PPT, the DXGI screen capturing module is operated to acquire a prepositioned frame in a graphics card cache; screen data is acquired according to the prepositioned frame; the screen data is monitored and the duration in which the screen data does not change is timed; and the screen data is modified when the duration exceeds a preset threshold; screen capture is performed by a DXGI screen capturing module when the screen data changes. During the whole process, when the duration in which the screen data does not change exceeds the preset threshold, the screen data is actively modified to avoid the frame dropping, by the DXGI screen capture module, that may occur when there is no change in the screen data, thereby enabling effective handling of the frame dropping during playback of the PPT file.

DESCRIPTION OF EMBODIMENTS

A DXGI screen capturing module is a build-in functional module in the Microsoft system. The DXGI screen capturing module can perform screen capture efficiently. The working principle of the DXGI screen capturing module is to send changed image data, and no data would be sent if there is no changed image data. Therefore, when the PPT playback is in a full-screen mode and the screen is not changed, acquisition of PPT image data by DXGI is slowed by one frame, which is the root cause of the frame dropping when the playback of the PPT file is in a DXGI screen capture mode. In the method and system for handling the frame dropping during playback of the PPT file according to the present invention, in view of the above-mentioned working principle of the DXGI screen capturing module, a screen data is monitored, and a duration in which the screen data does not change is timed; and the screen data is modified when the duration exceeds a preset threshold. When the screen data changes, DXGI screen capture module immediately captures and records (screen captures) the image data of the current frame of PPT and pushes the image data to the users, thereby effectively solving the frame dropping due to one frame delay when PPT is played in the DXGI screen capture mode.

Figure 1:
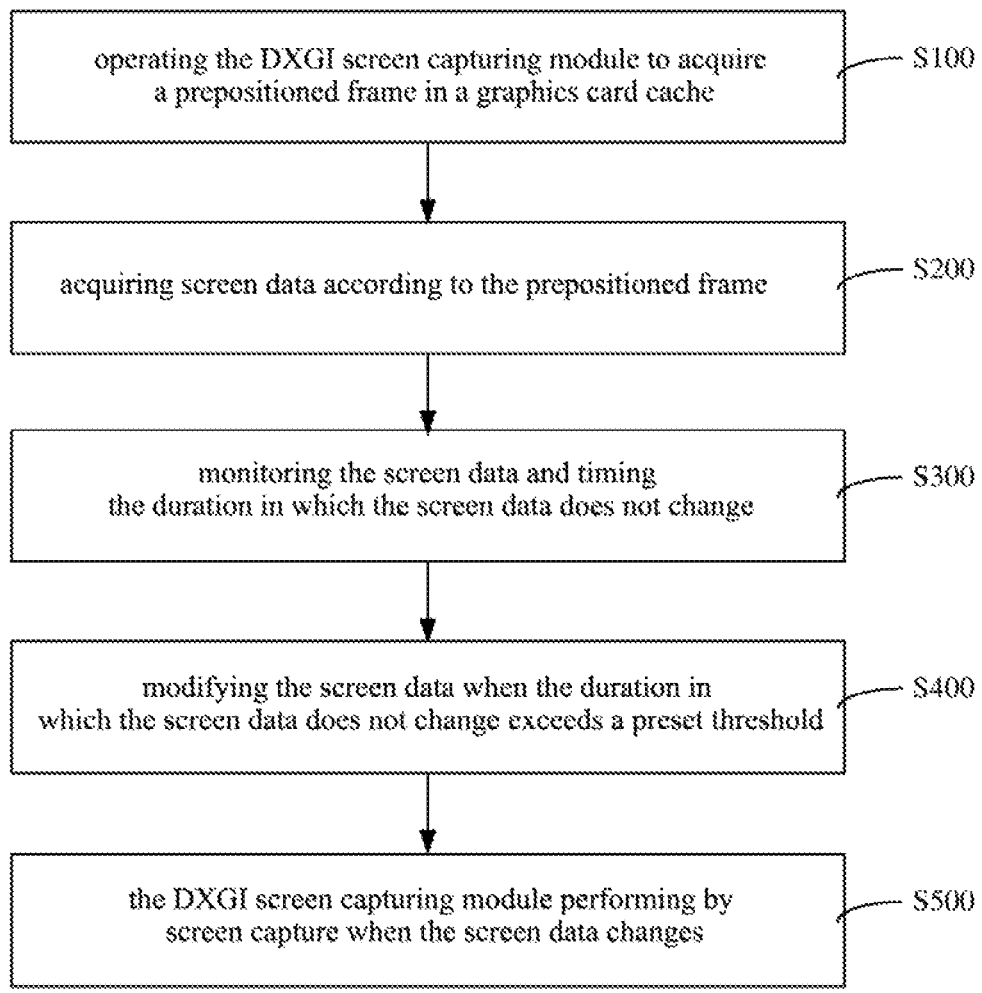
FIG. 1 is a schematic flowchart of a first embodiment of a method for handling frame dropping during playback of a PPT file according to the present invention.

As shown in FIG. 1, a method for handling frame dropping during playback of a PPT file, includes:

S100: operating a DXGI screen capturing module to acquire a prepositioned frame in a graphics card cache.

The Microsoft system refers to an operating system developed by the Microsoft Corporation, such as Windows™ operating systems. These operating systems can operate in a computer or smart terminal (tablet PC). A DXGI screen capturing module is a built-in component of all Microsoft systems. The DXGI screen capturing module is an image rendering tool of the Microsoft system, and enables efficient screen capture. DXGI screen capturing module is operated to acquire a prepositioned frame in a graphics card cache of a display device, where the prepositioned frame records the data associated with the screen captured from the current display interface.

S200: acquiring screen data according to the prepositioned frame.

Data to be presented in the following frame is recorded in the prepositioned frame, and the screen data can be acquired from these data.

S300: monitoring the screen data, and timing a duration in which the screen data does not change.

The screen data is monitored, and the duration in which the screen data does not change is timed, where the starting point of the timing is the time when the last PPT screen capture was completed.

S400: modifying the screen data when the duration in which the screen data does not change exceeds a preset threshold.

The preset threshold is a preset value which may be set according to historical data or current application scenario. For example, the preset threshold may be set to 1/10 second. Since the working principle of the DXGI screen capturing module is merely sending changed image data and not sending unchanged image data to ensure no frame dropping occurs during playback of the PPT file in the DXGI screen capture mode, the screen data is actively modified when the duration in which the screen data does not change exceeds the preset threshold, enabling that the DXGI screen capturing module to detect that the screen data has changed. There are various ways to modify the screen data including, for example, minor adjusting the cursor position on the screen to modify the screen data, or adjusting brightness and/or color of one pixel or a part of pixels on the screen to modify the screen data. If the duration in which the screen does not change does not exceed the preset threshold, the screen data is not modified.

S500: the DXGI screen capturing module performs screen capture when the screen data changes.

The DXGI screen capturing module performs screen capture immediately when it detects that the screen data is changed.

In the method of handling the frame dropping during playback of a PPT file according to the present invention, the DXGI screen capturing module is operated to acquire a prepositioned frame in a graphics card cache; screen data is acquired according to the prepositioned frame; the screen data is monitored and the duration in which the screen data does not change is timed; and the screen data is modified when the duration exceeds a preset threshold; screen capture is performed by the DXGI screen capturing module when the screen data changes. During the whole process, when the duration in which the screen data does not change exceeds the preset threshold, the screen data is actively modified to avoid the frame dropping during screen capturing by the DXGI screen capturing module, thereby enabling effective playback of the PPT file.

In one embodiment, a specific step of modifying the screen data when the duration in which the screen data does not change exceeds the preset threshold includes:

restorably modifying the screen data when the duration in which the screen data does not change exceeds the preset threshold.

The restorably modifying the screen data means that the modified screen data can be restored to the screen data prior to modifying. For example, when the screen data is modified in the way of moving the cursor on the screen where a position of the cursor is slightly moved, the screen data is accordingly changed, and then the cursor is returned to its original position, the screen data is restored to the screen data prior to modifying. When the screen data is modified in the way of modifying the brightness and/or color of one pixel or a part of pixels on the screen where one pixel or a part of pixels on the screen is/are changed, the screen data is accordingly changed, and then the brightness and/or color of the one pixel or the part of pixels is/are immediately restored, the screen data is restored to the screen data before modifying. The restorably modifying the screen data can ensure there is no perceived changes by the user on the premise of effectively modifying the screen data.

In one of the embodiments, a specific step of the restorably modifying the screen data when the duration in which the screen data does not change exceeds a preset threshold includes:

controlling, when the duration in which the screen data does not change exceeds a preset threshold, the cursor on the screen to move by a preset distance and then return to its original position so that the screen data is restorably modified.

The process of the above embodiments will be described in detail based on three time points. Assuming that there are three consecutive time points: a first time point, a second time point and a third time point. At the first time point, the duration in which the screen data does not change exceeds the preset threshold, the cursor on the screen is controlled to move by a preset distance. The second time point is a time point when the cursor is moved by the preset distance, and at this time, the screen data has already been modified, and then the cursor is returned to the original position (the position of the cursor at the first time point). The third time point is a time point when the cursor is returned to the original position. In the above process, the screen data is the same at the first and third time points, and the screen data is modified at the second time point, which can be detected by the DXGI screen capturing module and then the DXGI screen capturing module may perform screen capture. It should be noted that, intervals between the three time points are very small (for example, only one ten thousandth of one frame), and the smaller the intervals between the three time points are, the less perception of move by the user.

In one of the embodiments, before the step of controlling, when the duration in which the screen data does not change exceeds a preset threshold, the cursor on the screen to move by a preset distance and then return to its original position so that the screen data is restorably modified, the method further includes:

determining the preset distance to be 5 pixels.

In this embodiment, the preset distance is 5 pixels. It is proved by many experiments that the modified screen data can be effectively detected by the DXGI screen capturing module when the cursor is moved by 5 pixels, and furthermore a distance of 5 pixels is so small that the user will not perceive the movement of the cursor, which ensures there is no perception of the move by the user, thereby resulting in a pleasant user experience.

Figure 2:
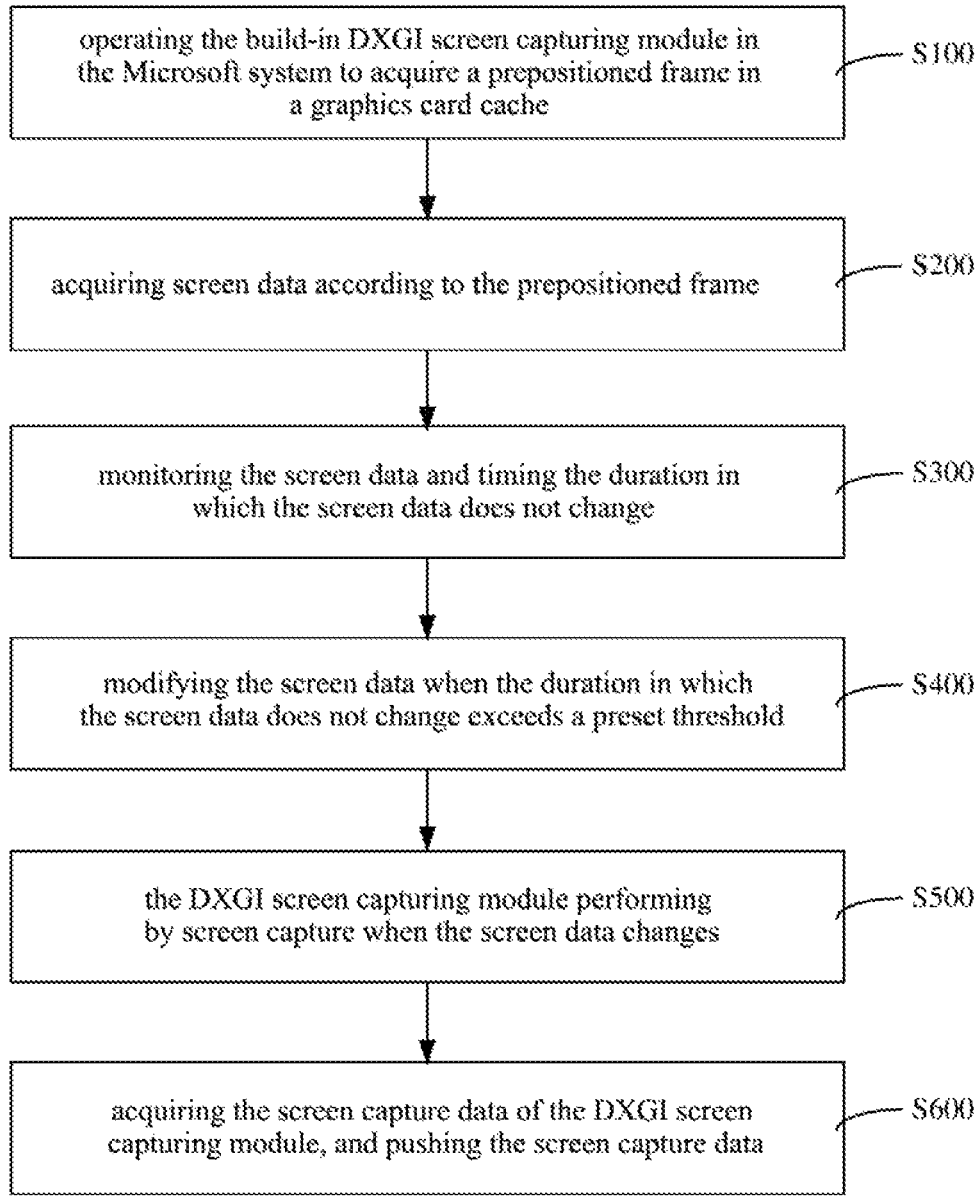
FIG. 2 is a schematic flowchart of a second embodiment of a method for handling frame dropping during playback of the PPT file according to the present invention.

As shown in FIG. 2, in one embodiment, the method for handling the frame dropping during playback of the PPT file further includes:

S600: acquiring screen capture data of the DXGI screen capturing module and pushing the screen capture data.

The DXGI screen capturing module acquires the screen capture data after the screen capture, and pushes the screen capture data to a user or a desktop of a display device such as, for example, a desktop of a computer display device.

Figure 3:
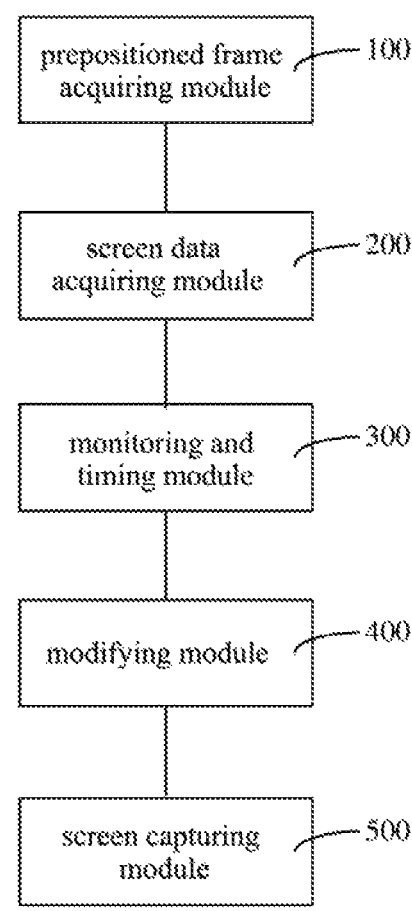
FIG. 3 is a schematic structure diagram of a first embodiment of a system for handling frame dropping during playback of the PPT file according to the present invention.

As shown in FIG. 3, a system for handling frame dropping during playback of a PPT file includes:

a prepositioned frame acquiring module 100 to operate a DXGI screen capturing module to acquire a prepositioned frame in a graphics card cache;

a screen data acquiring module 200 to acquire screen data according to the prepositioned frame;

a monitoring and timing module 300 to monitor the screen data and time a duration in which the screen data does not change;

a modifying module 400 to modify the screen data when the duration in which the screen data does not change exceeds a preset threshold;

a screen capturing module 500 to operate the DXGI screen capturing module to perform screen capture when the screen data changes.

In the system for handling frame dropping during playback of a PPT file according to the present invention, the prepositioned frame acquiring module 100 operates the DXGI screen capturing module to acquire a prepositioned frame in a graphics card cache; the screen data acquiring module 200 acquires screen data according to the prepositioned frame; the monitoring and timing module 300 monitors the screen data and times the duration in which the screen data does not change; the modifying module 400 modifies the screen data when the duration exceeds the preset threshold; the screen capturing module 500 operates the DXGI screen capturing module to perform screen capture when the screen data changes. In the whole process, the screen data is actively modified when the duration in which the screen data does not change exceeds the preset threshold to avoid frame dropping during screen capturing by the DXGI screen capturing module when the screen data is not changed, thereby enabling effective handling of the frame dropping during playback of the PPT file.

In one embodiment, the modifying module 400 is specifically to restorably modify the screen data when the duration in which the screen data does not change exceeds the preset threshold.

Restorably modifying the screen data by the modifying module 400 means that the screen data modified by the modifying module 400 can be restored by the modifying module 400 to the screen data prior to modifying. For example, when the screen data is modified in the way of moving the cursor on the screen where the position of the cursor is moved slightly, the screen data is accordingly changed, and then the cursor is returned to the original position, the screen data is restored to the screen data before modifying. When the screen data is modified in the way of modifying the brightness and/or color of one pixel or a part of pixels on the screen where the brightness and/or color of one pixel or a part of pixels on the screen is is/are changed, the screen data is accordingly changed, and then the brightness and/or color of the one pixel or the part of pixels is/are restored immediately. The screen data is restored to the screen data prior to modifying. The restorably modifying the screen data can ensure there is no perception of the move by the user on the premise of effectively modifying the screen data.

In one embodiment, the modifying module 400 is specifically to restorably modify the screen data by controlling the cursor on the screen to move by a preset distance and then return to its original position when the duration in which the screen data does not change exceeds a preset threshold.

The process of implementation of the function of the modifying module 400 will be described in detail based on three time points. Assuming that there are three consecutive time points: a first time point, a second time point and a third time point. At the first time point, the duration in which the screen data does not change exceeds the preset threshold, the cursor on the screen is controlled to move by a preset distance. The second time point is a time point when the cursor is moved by the preset distance, and at this time, the screen data has already been modified, and then the cursor is returned to the original position (the position of the cursor at the first time point). The third time point is a time point when the cursor is returned to the original position. In the above process, the screen data is the same at the first and third time points, and the screen data is modified at the second time point, which may be detected by the DXGI screen capturing module and then the DXGI screen capturing module may perform screen capture. It should be noted that, intervals between the three time points are very small (for example, only one third of one frame), and the smaller the intervals between the three time points are, the less perception of move by the user.

In one of the embodiments, the system for handling frame dropping during playback of a PPT file further includes:

a preset distance determining module to determine the preset distance to be 5 pixels.

In this embodiment, the preset distance is 5 pixels. It is proved by many experiments that the modified screen data can be effectively detected by the DXGI screen capturing module when the cursor is moved by 5 pixels, and furthermore a distance of 5 pixels is so small that the user will not perceive the movement of the cursor, which ensures there is no perception of the move by the user, thereby resulting in a pleasant user experience.

Figure 4:
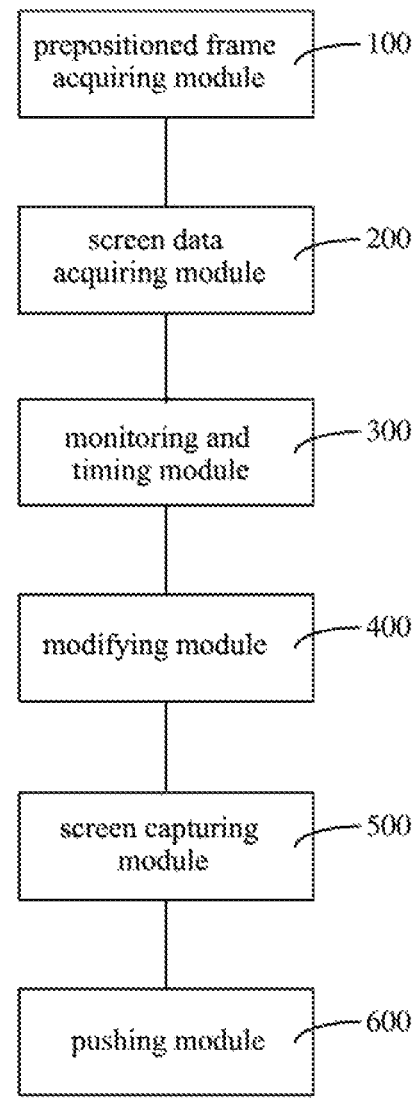
FIG. 4 is a schematic structure diagram of a second embodiment of a system for handling frame dropping during playback of the PPT file according to the present invention.

As shown in FIG. 4, in one of the embodiments, the system for handling frame dropping during playback of a PPT file further includes:

a pushing module 600 to acquire the screen capture data of the DXGI screen capturing module and push the screen capture data.

The screen capture data can be acquired after the screen capture of the DXGI screen capturing module, and the pushing module 600 pushes the screen capture data to a user or a desktop of a display device such as, for example, a desktop of a computer display device.

The above-mentioned embodiments are merely illustrative of several embodiments of the invention, and the description thereof is relatively specific and detailed, but is not to be construed as limiting the scope of the invention. It should be noted that a number of variations and modifications may be made by those skilled in the art without departing from the spirit of the invention. These variations and modifications are all within the scope of the invention. The scope of the invention should be subject to the appended claims.

What is claimed is:

1. A method for avoiding frame dropping during playback of a file, the method comprising:
    acquiring, by a processor executing an operating system comprising a screen capturing module, a prepositioned frame in a graphics card cache, wherein screen data to be presented in a next frame are recorded in the prepositioned frame;
    acquiring the screen data according to the prepositioned frame;
    monitoring the screen data and timing a duration in which the screen data do not change; and
    responsive to detecting that the duration in which the screen data do not change exceeds a preset threshold, triggering restorable modification operations to the screen data, wherein the restorable modification operations to the screen data are executed within a time interval for refreshing one frame according to a refresh rate of a screen and comprise modifying the screen data to a modified screen data and restoring the modified screen data back to the screen data prior to modifying, and wherein the restorable modification operations cause the screen capturing module to perform a screen capture.

2. The method according to claim 1, wherein the file is a PowerPoint (PPT) file, and wherein the restorable modification operations comprise:
    restorably modifying the screen data when the duration in which the screen data do not change exceeds the preset threshold.

3. The method according to claim 2, wherein the restorably modifying the screen data when the duration in which the screen data do not change exceeds the preset threshold specifically comprises:
    controlling, when the duration in which the screen data do not change exceeds the preset threshold, a cursor on a screen to move by a preset distance and then return to the cursor to an original position so that the screen data is restorably modified.

4. The method according to claim 3, wherein prior to controlling, when the duration in which the screen data do not change exceeds the preset threshold, the cursor on the screen to move by the preset distance and then return to its original position so that the screen data is restorably modified, the method further comprises:
    setting the preset distance to be 5 pixels.

5. The method according claim 1, wherein after the performing screen capture by the screen capturing module responsive to the restorable modification operations, the method further comprises:
    acquiring screen capture data of the screen capturing module and pushing the screen capture data.

6. The method according to claim 1, wherein the preset threshold is one tenth of a second.

7. The method according to claim 1, wherein modifying the screen data corresponds to a first time period from a first time point to a second time point, and restoring the screen data to its original form corresponds to a second time period from the second time point to a third time point, and wherein a combined time period of the first and second time periods is less than the time interval for refreshing one frame.

8. A system for handling frame dropping during playback of a file, comprising:
    a hardware processor executing an operating system comprising a screen capturing module to:
    acquire a prepositioned frame in a graphics card cache, wherein screen data to be presented in a next frame are recorded in the prepositioned frame;
    acquire the screen data according to the prepositioned frame;
    monitor the screen data and time a duration in which the screen data do no change; and
    responsive to detecting that the duration in which the screen data do not change exceeds a preset threshold, trigger restorable modification operations to the screen data, wherein the restorable modification operations to the screen data are executed within a time interval for refreshing one frame according to a refresh rate of a screen, and the screen data are modified to a modified screen data and the modified screen data are restored back to the screen data prior to modifying, and wherein the restorable modification operations cause the screen capturing module to perform a screen capture.

9. The system according to claim 8, wherein the file is a PowerPoint (PPT) file.

10. The system according to claim 9, wherein the hardware processor is further to control, when the duration in which the screen data do not change exceeds the preset threshold, a cursor on a screen to move by a preset distance and then return the cursor to an original position, so that the screen data is restorably modified.

11. The system according to claim 10, wherein the hardware processor is further to set the preset distance to be 5 pixels.

12. The system according to claim 8, wherein the hardware processor is further to, after performing screen capture when the screen data changes, acquire screen capture data of the screen capturing module and push the screen capture data.

13. The system according to claim 8, wherein the preset threshold is one tenth of a second.

14. The system according to claim 8, wherein modifying the screen data corresponds to a first time period from a first time point to a second time point, and restoring the screen data to its original form corresponds to a second time period from the second time point to a third time point, and wherein a combined time period of the first and second time periods is less than the time interval for refreshing one frame.

* * * * *